W. F. OGLESBY.
DEVICE FOR CLIPPING FRUIT PITS.
APPLICATION FILED APR. 16, 1917.
Patented Feb. 12, 1918.
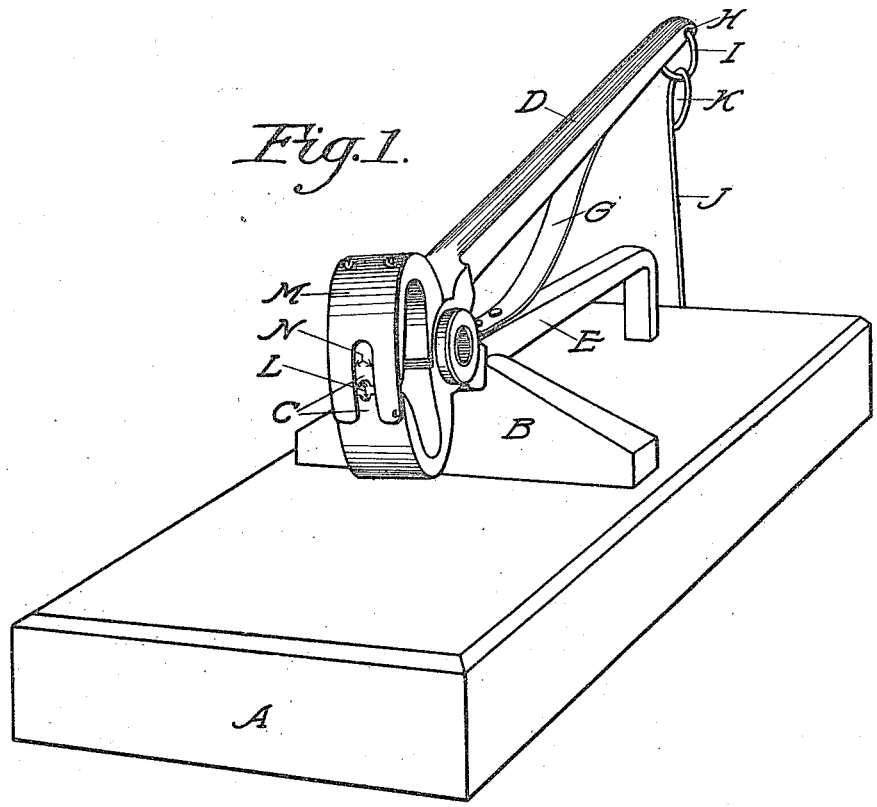
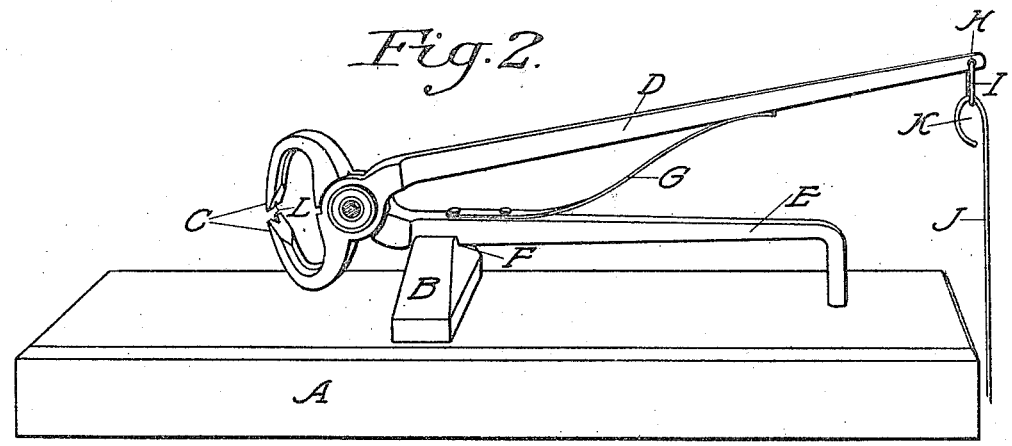
Inventor:
William F. Oglesby,
By
Attorney

UNITED STATES PATENT OFFICE.

WILLIAM F. OGLESBY, OF BERKELEY, CALIFORNIA, DEDICATED, BY MESNE ASSIGNMENTS, TO THE GOVERNMENT OF THE UNITED STATES AND TO THE PEOPLE OF THE UNITED STATES.

DEVICE FOR CLIPPING FRUIT-PITS.

1,256,035. Specification of Letters Patent. Patented Feb. 12, 1918.

Application filed April 16, 1917. Serial No. 162,591.

(DEDICATED TO THE PUBLIC.)

*To all whom it may concern:*

Be it known that I, WILLIAM F. OGLESBY, a citizen of the United States of America, residing at Berkeley, in the State of California, (whose post-office address is Berkeley, California,) have invented a certain new and useful Device for Clipping Fruit-Pits.

The object of my invention is to produce a simple and inexpensive device adapted for clipping off the ends of olive or other fruit pits without injury to the kernels. Seeds clipped in this way germinate in about one-eighth of the time that it takes unclipped seeds to germinate, and, in addition, they germinate with greater uniformity.

The nature, characteristic features, and scope of my invention will be more readily understood from the following description taken in connection with the accompanying drawings, wherein—

Figure 1 is a perspective view of my device; and

Fig. 2 is a side view of clipper blades with shield removed.

Referring to the drawings, A represents a block provided with a shoulder, B, forming the base supporting the apparatus. The cutting implement comprises a pair of nippers provided with a pair of handles, D and E. The free end of the handle, E, is bent at right angles and secured to the base, A, in any suitable manner, while the nippers, C, rest in a notch, F, cut in the shoulder, B, and are held in operative position by means of said notch and the attachment of handle, E, to the base, A. Fastened to the upper side of handle, E, by means of screws or rivets is a spring, G. The end of said spring, G, comes in contact with the lower side of handle, D, and thereby serves the purpose of holding the cutting blades of the nippers, C, apart. An aperture, H, is cut in the end of handle, D, for the reception of ring, I. A wire attachment, J, is adjusted to ring, I, by means of the loop, K, formed in the end thereof. This wire may be used for connecting the handle, D, to a foot lever, so that the device may be operated by foot power. A semi-circular notch or cavity, L, is cut or filed in the blades of the nippers as shown in Fig. 2 for reeciving the fruit pits to be clipped. To the upper blade of the nippers, C, is affixed a shield, M, having an opening, N, so as not to obstruct the entrance of the fruit pits to the cavity, L, of the nipper blades. The shield is designed for preventing injury to the fingers of the operator when feeding the pits to the device.

In practising my invention, I take the olive or other fruit pits to be clipped and insert them by hand in the cavity, L, then press or pull down the handle, D. This action brings the blades of the nippers, C, together, thereby cutting off the end of the fruit pit and leaving the kernel uninjured. Upon releasing pressure from the handle, D, the nipper blades are thrown apart by means of the spring, G.

Having thus described my invention, I claim:

A pit clipping device comprising pivoted members having at their forward ends inturned portions forming transverse cutting blades each provided in its edge with a notch, the two notches, when said blades are engaged, forming a pit supporting opening.

In testimony whereof, I hereunto affix my signature in the presence of two subscribing witnesses.

WILLIAM F. OGLESBY.

Witnesses:
A. P. REDINGTON,
ARTHUR E. OGILVY.